United States Patent [19]

Ruoff et al.

[11] 3,731,890

[45] May 8, 1973

[54] DIGITAL MAGNETIC TAPE TRANSPORTS

[75] Inventors: Laurence J. Ruoff, Newport Beach; Lani W. Brewer, Anaheim, both of Calif.

[73] Assignee: Data Handling Corporation, Santa Ana, Calif.

[22] Filed: Jan. 19, 1972

[21] Appl. No.: 218,987

[52] U.S. Cl. ............242/188, 242/75.52, 250/219 R, 318/7

[51] Int. Cl. .......B65h 59/38, G03b 1/04, G11b 1/52

[58] Field of Search .........242/186–190, 75.5–75.52; 250/219 R; 318/7

[56] References Cited

UNITED STATES PATENTS

| | | | |
|---|---|---|---|
| 3,244,954 | 4/1966 | Branco | 318/7 |
| 3,470,382 | 9/1969 | Tobey | 250/219 R |
| 3,547,369 | 12/1970 | Potucek | 242/75.52 |

*Primary Examiner*—Leonard D. Christian
*Attorney*—Frank R. Trifari

[57] ABSTRACT

This invention relates to a device for sensing tape position on a reel to reel tape handling mechanism. The device is essentially a tape tension arm angular position transducer having two parts, the first part being a photo sensing and emitting mechanism composed of a light emitting diode and two phototransistors arranged on a bias in a sensor assembly beneath the front panel of the tape deck, the second part being a light reflective pattern affixed to and cooperating with the sensor assembly and mounted to the tension arm of the tape handling mechanism. The light reflective pattern consists of two concentric ring segments positioned on a portion of the tension arm, each ring segment having linearly varying light reflectivity to non reflectivity characteristics from end to end in opposite senses. The two photo transistors are each responsive to reflection of light off respective reflective rings and their respective outputs are arranged to produce oppositely biased signals, thereby giving an indication of the arm position. The signals are coupled to the supply or take up reel drive mechanisms to counter balance the tension as desired.

12 Claims, 4 Drawing Figures

DIGITAL MAGNETIC TAPE TRANSPORTS

Figure 1:
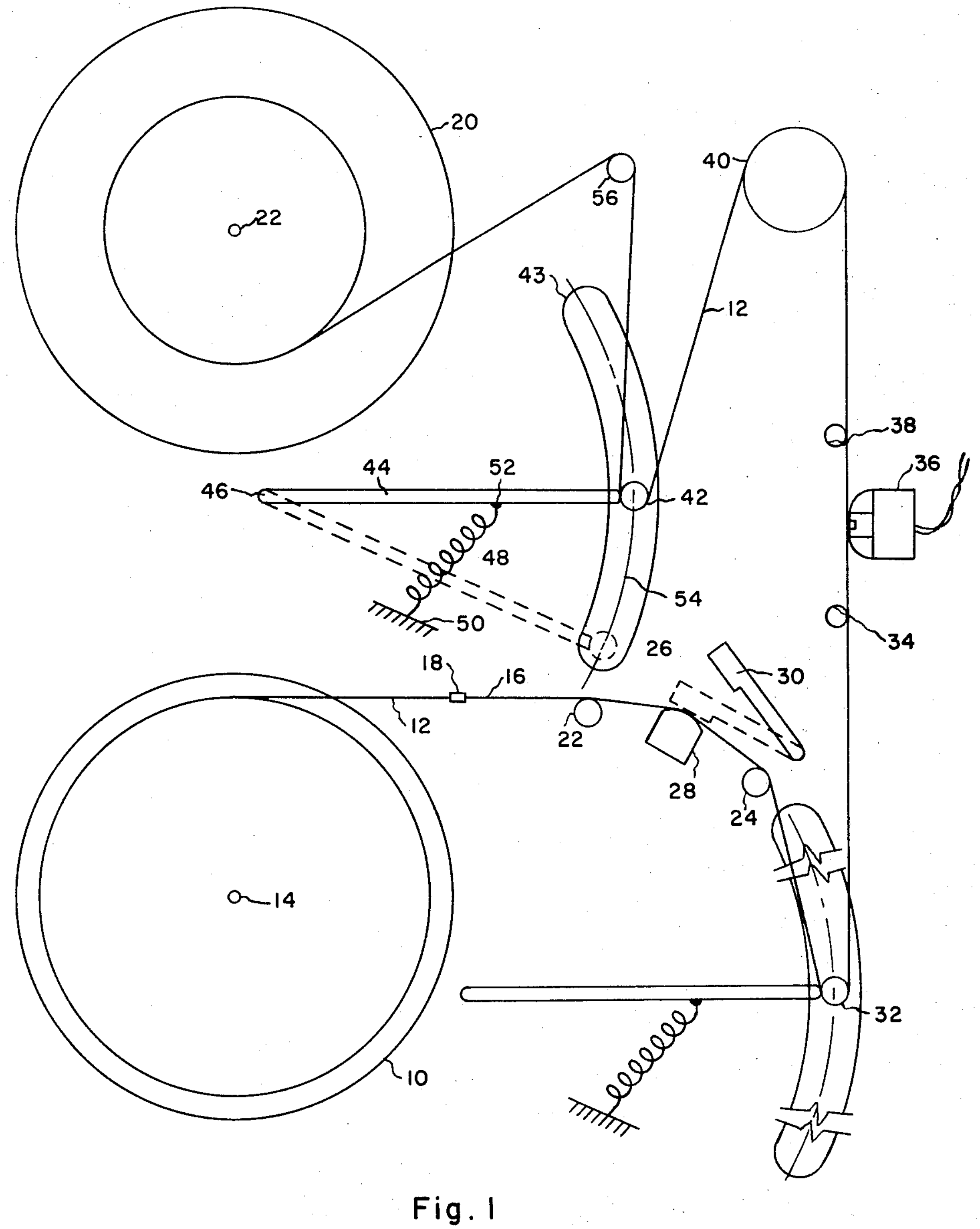

This invention relates generally to spooling mechanisms and more particularly to a device for sensing the position of tape in a reel to reel spooling mechanism.

In conventional transporting mechanisms for deploying tape from a first supply reel to a second take up reel, the tape being fed past one or a series of recording and reproducing devices, it is desirable to know the condition of the tape during its transit. For example, one condition desired is a beginning or end or tape sense, and to this end beginning or end of tape sensors have been developed to measure when the tape has reached the end of the reel or is at the beginning of the reel. It is also desirable to know during the transit of the tape whether the tape is continuing its forward movement or has jammed, or whether it has stopped, or reached some other condition other than its normal transit position. Also, it is desirable to know that the tape tension is being kept at a constant level during its feed from reel to reel.

In conventional spooling mechanisms, tape tension is provided by suitable tape tension arms. In a two reel system employing capstan drive, three motors are employed. Two are attached to the tape reels and one to the capstan. In this case, two tension arms are employed, one in the tape path between the capstan and the supply reel, and the other between the capstan and take up reel. The tension arms perform several functions, including that of temporary tape storage to take up excess or increased tension as a result of differentials created by the different accelerations between the capstan and tape reels. Another function is to provide an indication of tape motion, which can be used to provide proper rotational speeds to the tape reels. A further function is to perform the forgoing functions while maintaining nearly constant tape tension. To accomplish the forgoing effectively, it is necessary to provide some means of accurately measuring angular position of the tension arm over its positional range.

Prior art devices for providing such measurement have employed such devices as potentiometers affixed to the tensioning arms. Variation of the tensioning arm, in such devices, were used for indicating variations of angular position and were translated by means of the variation of the potentiometer to appropriate rates or voltage levels for control of the tape reel movement. These systems, however, are inefficient in their reliance upon mechanical contacting and often become inaccurate due to poor slide control, dirty contacts, temperature and humidity changes, and the like. Optical devices which have been used for this purpose have been generally inaccurate or incapable of fine adjustment.

It is, therefore, an object of the present invention to provide a novel angular position measuring sensor device for ensuring that tension arms will be utilized to their full advantage and that a constant or desirable tension will be maintained in a reel to reel tape drive spooling mechanism.

It is a further object of the present invention to provide a tape tension arm angular position sensor which will not be dependent upon mechanical contacts.

It is still a further object of this invention to provide a tape tension arm angular position sensor device which will be highly accurate and independent of environmental factors.

The foregoing objects are accomplished with the employment of a photo optic generating and sensing mechanism which reacts with a reflective pattern affixed to a tensioning arm fan blade shaped plate for the purposes of sensing tape tension arm angular position relative to a fixed reference position.

Figure 2:
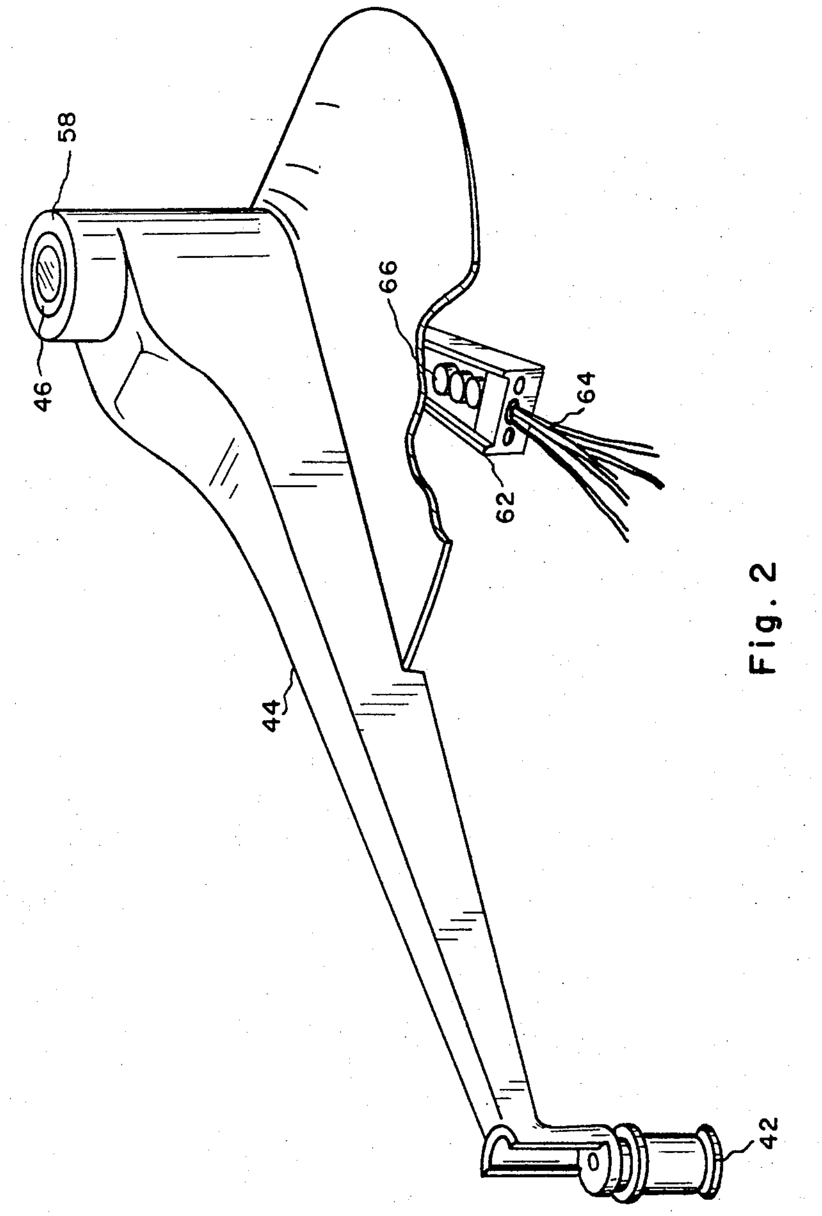
Figure 4:
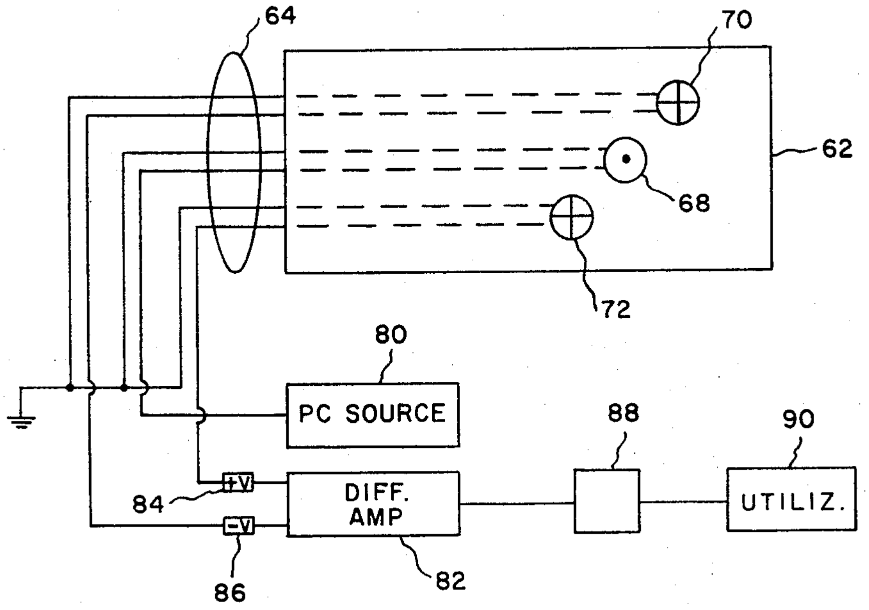
Figure 3:
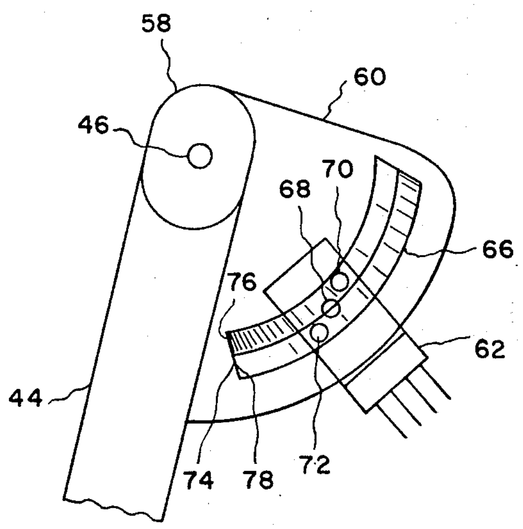

The foregoing objects and brief description of the present invention as well as other features are advantages of the invention will be more apparent from the following detailed description of the invention when read in connection with the accompanying drawings wherein:

FIG. 1 shows a general schematic view of the front of a typical spooling mechanism employing a tensioning arm, FIG. 2 is a detailed section showing the tensioning arm with sensor, FIG. 3 is a further view showing the sensor, arm assembly, and reflective device, FIG. 4 is a circuit diagram showing the biasing and excitation of the photo diode and pick-ups, as well as the output utilization thereof.

Referring now to FIG. 1 there is illustrated a schematic diagram showing the front face of a typical spooling mechanism employing two tension arms. Although only two tension arms are shown it is understood that a single tension arm can be employed. As shown, a first supply reel 10 containing a medium 12 to be spooled is positioned about a central shaft 14 which is driven by a suitable drive mechanism, not shown. The medium to be spooled, such as the tape 12, includes at its front end a leader 16 coupled to the tape by means of a leader joint 18. The leader is threaded through a series of intermediate stations to be explained further in detail below to a take up reel 20 having a central shaft 22 driven by a suitable drive mechanism, not shown. Intermediate the reel 10 and the reel 20 is a first roller 22 and a second roller 24, between which is positioned a tape braking device 26 consisting of a post 28 and a two positional arm 30 positioned opposite the tape for selectively clamping the tape in position by a suitable external control, not shown. The roller 32, which forms part of a tension arm as will be explained in greater detail below, positions the tape for operative engagement with the roller 34 for transference over the recording/reproducing station indicated generally as 36. A further roller 38 opposite the station 36 serves to position the tape properly over the read station 36. A speed metering capstan 40 coated with a suitable high friction material or the like is provided after the roller 39 along the path of the tape. Although not shown, the tape drive is effected by virtue of a motor coupled to the capstan. Further along the tape path is provided a roller 42 coupled to a tension arm 44 pivotally mounted at one end 46. A spring 48, fixed at one end 50 to the frame of the machine and at the other end 52 to the tension arm 44, is provided for maintaining desired tension in the tape by applying pressure in a downward direction as shown in FIG. 1 to the roller 42 thereby maintaining the tape 12 in tension. As illustrated, the tape tensioning roller 42 defines an arcuate path 54 about the pivot point 46 having a radius defined by the length of the arm 44. The normal position of the arm absent tension in the roller is indicated by the dashed line in the lower position. Normally, the arm is in position as shown with appropriate tension applied to the tape. Higher tension would pull the arm further along the path 54. The tension arm coupled to the roller 32 acts and is constructed in the same manner.

A further roller 56 serves to couple the tape from the tensioning roller 42 to the take-up reel 20. As shown in FIG. 1, the roller 42 is designed to extend up from the deck surface to contact the tape 12. The arm and spring are actually mounted below the surface of the deck, and the roller 42 extends up through a curved slot 43, designed to accommodate the roller travel.

Referring to FIG. 2 the sensor and arm assembly is shown in greater detail. In FIG. 2 the tension arm 44 is provided with a roller 42 in the form of a freely rotating spool. At the other end of the arm the pivot point 46 is defined by a bearing, illustrated as a sleeve bearing but with the understanding that ball bearings may be employed, and cooperating with a central shaft fixed mounted to the deck. The bearing, centrally mounted to a rounded shaft 58 provided for that purpose, results in unrestricted movement of the arm 44 about the pivot point. The arm 44 includes, around the base of the pivot point area, a support means constructed as a fan shaped plate, referred to hereinafter as a fan plate 60 which serves as a surface for an interiorly mounted reflector described in further detail below. Mounted on the lower surface of the decks and positioned beneath the fan plate 60 is the sensor 62 having a plurality of leads 64 emerging therefrom. The sensor 62 forms a support means which includes therein a series of photogenerating and photodetecting elements indicated generally as 66.

Referring to FIG. 3 there is shown a detail of the sensor and arm assembly. The arm 44 is provided with a pivot point 46 supported in a central shaft 58. The view of FIG. 3 is from the top of that shown in FIG. 2, however, the sensor area is shown, for illustrative purposes only, as if the fan plate 60 were transparent. The sensor 62 is mounted, as shown in FIG. 3, with its longitudinal axis more or less aligned with a radial emerging from the pivot point 46. Contained within the sensor 62 are photogenerating and sensing segments 66. The central segment 68 is a light emitting diode, emitting radiation in the form of light. The first outer segment 70 and the second outer segment 72 are each photo transistors responsive to the radiation emitted by the light emitting diode 68.

Mounted directly to the underneath portion of the fan plate 60 is a photo reflective segment area 74. This area includes a first band or upper section 76 and a second band or lower section 78 and is arranged in a form of two concentric partial rings each having a central axis coinciding with the axis of the pivot point 46. As illustrated, each of the reflective bands 76 and 78 contact each other along one dimension and are each provided with a variation in the form of a gradation in reflectivity. The variation is opposite in nature. That is, the reflected area 76 is dark at one end, at the left end as shown in the Figure, and is light at the opposite end. The gradation is gradual along its length. The band 78 has a like gradation but in the opposite direction.

One mode of providing the reflective bands onto the fan plate 60 is to provide a photographic image with the desired light variation and affix same as by a suitable adhesive to the fan plate.

In order to conserve space and maintain the width of the reflective segments narrow while still maintaining acceptable resolution and spacing between the diode and sensors the sensing segments 66 are aligned on an acute angle, preferably a 45° axis with respect to a radial line emerging from the pivot point 46 and passing through the center of the light emitting diode 68. The sensing bands 74 are arranged such that the center of both circumferential and radial positions lie precisely over the center of the light emitting diode 68. As a result of this positioning, the photo transistors 70 will lie displaced in one direction along the band 76 whereas the photo transistor 72 will lie displaced by the same direction and in the same dimension along the band 78. In operation, light emission by the light emitting diode 68 is incident upon the reflective bands 76 and 78 and reflect therefrom in accordance with the degree of reflectivity represented by the variation of optical characteristics of the band. The resultant levels sensed by photo transistors 70 and 72 represents the effective position of the reflective bands relative to the sensor units 62. The diode 68 is preferably of Gallium Arsenide material and the photo transistors are preferably constructed of silicon. It is noted that the sensitivity of the silicon photo transistors to infrared radiation, typically i.e. 8,100 angstroms and the propensity of the diode 68 to emit in that range, decreases the system's susceptibility to interference as a result of ambient radiation.

As evident from FIG. 3, when the fan plate 60 is centered over the sensor 62, the reflective pattern opposing each of the photo transistors 70 and 72 is the same. As the arm 44 is angularly displaced, the reflective pattern shifts in one or the other direction, and the reflectivity opposite each photo transistor shifts in opposite directions.

An exemplary electrical circuit indicating the type of operation which is effected by the sensor unit 62 is illustrated in FIG. 4. Thus, diode 68 is positioned along a bias angle between the photo transistors 70 and 72 within the body of the sensor 62. A plurality of leads 64 emerging from the sensor 62 are each coupled to their associated active element at one end and at the other end to an appropriate source or utilization. Thus, a power source 80 is shown which provides energization for activation of the diode 68. The outputs of each of the photo transistors 70 and 72 are coupled to a differential amplifier 82 through respective biasing networks 84 and 86. The effect of this biasing arrangement is to provide to the differential amplifier a signal indicating and maximizing the distinction between the different reflectivities faced by the light emerging from photo diode 68 and incident upon the photo transistors 70 and 72. The greater reflectivity to one or the other results in a greater differential signal being applied to the differential amplifier. Thus, the greater the deflection of the arm, the greater the signal difference. The output of the differential amplifier is connected to amplifier and phase correction circuitry 88 which can be employed to apply an output signal to a utilization device indicated generally as 90. The output signal is thus an indication of the duration and extent of penetration of the arm unit in either one or the other of its non-neutral positions. The signal is employed to drive the motors attached to the reels in order to correct the tape tension in accordance with the degree of deflection of a tape tension arm. It should be evident that other means or modes of sensing the differential signals could be employed. The foregoing is presented only as an example of a possible method of determining the amount of displacement as a result of the different reflectivities that the reflective bands may occupy relative to the sensing device 62.

It thus may be seen that the present invention provides for a suitable non contacting tension measuring device which will provide an indication, by means of a substantially error free transmission of high accuracy, of the angular position of a tension arm.

In the foregoing embodiment, circuitry for a single tension arm has been illustrated. It should be obvious, however, that where two tension arms are employed, particularly where independent driving devices are provided for supply and take-up reels, the circuitry is duplicated for each arm.

Although the device has been illustrated for reel to reel tape configurations it should be evident that the angular position measuring device can be utilized in other systems employing tape or like drives requiring a constant or observable tension factor with respect to the driven medium. It will be further understood that other means, modes and apparatus deriving the output of the signals from the sensor can be employed in any desired configuration. Thus, a servo loop can be employed whereby the output signal from the sensor may be employed to speed up or slow down the drive motors controlling the rate of feed of the tape and thereby effect the tension. Further, the tension arm signal may be employed for providing an alarm indicating a break in the tape, and thus a complete absence of tension. The tension arm can also be employed to detect jamming of the tape, and thus a high degree of tension caused by the drive applied by the drive motor.

It should be apparent that other modifications, changes, alterations and improvements in the present device could be made without departing from the spirit and scope of the present invention.

What is claimed is:

1. A flexible medium drive system employing an angular position measuring and detecting apparatus comprising first and second support means, one of said support means having angular movement about a point relative to the other in response to the amount of tension developed by the flexible medium, the first of said support means including first and second bands of optically reflective material, said first band having a variation in reflectivity from one end to the other, said second band having a similar but opposite variation in reflectivity from end to end, said first and second bands being in substantial alignment, said second support means including first means for generating radiation, second and third means each responsive to radiation generated by said first means and mounted on said second support means, means positioning said first support means with respect to said second support such that radiation emitted by said first means and incident upon one of said bands is reflected to said second means, and radiation is generated by said first means and incident upon said second band is detected by said third means and means responsive to the signal generated by said second means and the signal generated by said third means for providing an indication of the angular position of said second support means relative to said first support means caused by the tension of said flexible medium.

2. The combination of claim 1 wherein said first support means is a fan shaped plate coupled to a tension arm.

3. The combination of claim 2 wherein said bands are arranged on said fan shaped plate as two concentric partial rings having a central axis coinciding with the axis of the said point.

4. The combination of claim 1 wherein said second support means includes a sensor, said first means comprising a light emitting diode, said second and third means each comprising a photo transistor.

5. The combination of claim 1 wherein said second support means includes said first, second and third means aligned on an acute angle with respect to a radial line emerging from said point and passing through the center of said first means, and said second support means includes first and second concentric bands of opposite reflectivity gradation, said first support means being positioned with respect to said second support means such that said second means faces one of said bands, said third means faces the other of said bands, and said first means lies therebetween.

6. The combination of claim 1 wherein said second and third means are oppositely biased, and differential amplifier means are provided with a first and second input thereof responsive to the respective biased signals of said second and third means, and means coupled to the output of said differential amplifier for utilizing said differential amplifier output.

7. A flexible medium drive system and deck employing an angular position measuring and detecting apparatus for a tension arm comprising first and second support means, a supply reel rotatably mounted to said deck for feeding said medium, a take up reel rotatably mounted to said deck for taking-up said medium, at least one said tension arm, said tension arm including a pivot point at one end and a roller contacting said medium at the other end, means for spring biasing said tension arm for applying tension to said medium, one of said supports affixed to said tension arm, the other of said supports affixed to said deck, each said support means having movement relative to the other in response to the amount of tension developed by the flexible medium, the first of said supports including first and second bands of optically reflective material, said first band having a variation in reflectivity from one end to the other, said second band having a similar but opposite variation in reflectivity from end to end, said first and second bands being in substantial alignment, said second support including first means for generating radiation, second and third means each responsive to radiation generated by said first means and mounted on said second support, means positioning said first support with respect to said second support such that radiation emitted by said first means and incident upon one of said bands is reflected to said second means, and radiation is generated by said first means and incident upon said second band is detected by said third means, and means responsive to the signal generated by said second means and the signal generated by said third means for providing an indication of the angular position of said tension arm provided by the relative tension of said flexible medium.

8. The combination of claim 7 wherein said first support means is a fan shaped blade coupled to a tension arm, said tension arm being pivotable about a point in response to the relative tension of said flexible medium.

9. The combination of claim 8 wherein said bands are arranged on said fan shaped blade as two concentric partial rings having a central axis coinciding with the axis of the said point.

10. The combination of claim 7 wherein said second support means includes a sensor, said first means comprising a light emitting diode, said second and third means each comprising a photo transistor.

11. The combination of claim 7 wherein said second support means includes said first, second and third means aligned on an acute angle with respect to a radial line emerging from said point and passing through the center of said first means, and said second support means includes first and second concentric bands of opposite reflectivity gradation, said first support means being positioned with respect to said second support means such that said second means faces one of said bands, said third means faces the other of said bands, and said first means lies therebetween.

12. The combination of claim 1 wherein said second and third means are oppositely biased, and differential amplifier means are provided with a first and second input thereof responsive to the respective biased signals of said second and third means, and means coupled to the output of said differential amplifier for utilizing said differential amplifier output.

* * * * *